United States Patent [19]

Budenbender

[11] Patent Number: 5,125,780
[45] Date of Patent: Jun. 30, 1992

[54] METHOD OF AND APPARATUS FOR THE FORMATION OF CONTAINERS

[75] Inventor: Bernd Budenbender, Stade, Fed. Rep. of Germany

[73] Assignee: Buco Budenbender & Co., Stade, Fed. Rep. of Germany

[21] Appl. No.: 777,438

[22] Filed: Oct. 11, 1991

Related U.S. Application Data

[63] Continuation of Ser. No. 471,227, Jan. 25, 1990, abandoned.

[30] Foreign Application Priority Data

Jan. 26, 1989 [DE] Fed. Rep. of Germany ....... 3902292

[51] Int. Cl.⁵ .............................................. B23K 26/08
[52] U.S. Cl. .......................................... 413/4; 413/6; 219/121.64
[58] Field of Search ................... 413/4, 5, 6, 78; 228/137; 219/121.14, 121.64

[56] References Cited

FOREIGN PATENT DOCUMENTS

| | | |
|---|---|---|
| 0200098 | 4/1984 | European Pat. Off. . |
| 0177945 | 10/1985 | European Pat. Off. . |
| 0199279 | 4/1986 | European Pat. Off. . |
| 3600532 | 10/1986 | Fed. Rep. of Germany . |
| 3802000 | 10/1988 | Fed. Rep. of Germany . |
| 61037389 | 7/1984 | Japan . |

OTHER PUBLICATIONS 4.2.Anwendung von Lasern in der Materialbearbeitung, pp. 139-155, (German language).

*Primary Examiner*—Bruce M. Kisliuk
*Assistant Examiner*—Jack Lavinder
*Attorney, Agent, or Firm*—Herbert Dubno

[57] ABSTRACT

A fold along the exterior of a container body between the rim of the latter and a sheet metal closure member forming the top or bottom of the container defines a crevice between material of the closure member and the container body adjacent the latter. A laser beam is directed in this crevice and the container and beam are relatively rotated to form a continuous weld in the crevice so that reflection of laser energy from the weld site is avoided.

8 Claims, 3 Drawing Sheets

METHOD OF AND APPARATUS FOR THE FORMATION OF CONTAINERS

This is a continuation of co-pending application Ser. No. 07/471,227 filed on Jan. 25, 1990 now abandoned.

CROSS REFERENCE TO RELATED APPLICATION

This application is related to my copending application Ser. No. 07/300,459 filed Jan. 19, 1989 now U.S. Pat. No. 4,945,202 issued Jul. 31, 1990.

FIELD OF THE INVENTION

The present invention relates to a method of and an apparatus for the formation of containers and, more particularly, for the additional welding of a fold formed between a closure member, i.e. either the bottom or the top of a container, and the rim of a cylindrical body at the respective end. The invention relates especially to the formation of metal containers having rolled folds locking the closure member to the container body and more specifically to drums, barrels, cans and like containers.

BACKGROUND OF THE INVENTION

It is known to provide a container by attaching to a cylindrical container body at one or both ends a respective closure member which is generally disk-shaped and has an outer edge which can be locked to the rim of the container body by folding or rolling the rim of the container body and the edge portion of the closure member together.

The closure member can be, as has been indicated, the top or cover of the container or a bottom thereof and generally the fold or rolled interlock between the closure member and the container body lies along the exterior of the container to reinforce the latter and protect the container against shocks during movement thereof.

From M. Nowicki: Laser in Elektroniktechnologie und Materialbearbeitung, Akademische Verlagsgesellschaft Geest & Portig K.-G., Leipzig 1982, it is known to weld sheet metal using a laser beam.

Various possible weld techniques for containers are also described and illustrated in German Patent document DE-OS 36 00 532 although a totally satisfactory technique for both mechanically securing closure members on a container and sealing seam is not here described.

German Patent Document DE-OS 37 06 916 discloses the connection of bottoms and covers of containers with the respective container bodies by the formation of folds or rolled-together portions in conjunction with a welding of these portions by means of a laser beam where these portions overlap to mechanically strengthen the fold and effect a sealing thereof.

In carrying out the latter process and in general with laser beam welding, it has been found that even slight deviations of the focus of the beam may be detrimental to a reliable sealing and mechanical connection of the overlapping parts. Furthermore, when bright sheet metal is to be used, the reflection of the laser beam may be such that sufficient energy is reflected that an unreliable weld can be formed. This also applies generally to the welding of aluminum sheet metal and even white sheet metal of other types.

OBJECTS OF THE INVENTION

It is, therefore, the principal object of the present invention to provide an improved method of making a container whereby the aforedescribed drawbacks are avoided.

It is also an object of this invention to provide an improved apparatus for making a container which will have mechanically more reliable fully sealed folds between the cover member and the container body.

A further object of this invention is to provide a method of an apparatus for additionally welding a fold connection between a cover member and a container body of sheet metal so that slight deviations of the focus of the laser beam will not be detrimental to the weld that is to be formed and reflection and focusing losses of energy from the weld site can be avoided or greatly limited in their effect, thereby ensuring improved mechanical strength and sealing reliability.

SUMMARY OF THE INVENTION

According to an important feature of the invention, the laser beam is directed against the body of the container, either internally or externally, at a junction or crevice formed by the fold therewith so that the welding point which is rotated along the fold to form a weld seam, is located deep within the crevice, thereby minimizing any reflection outwardly of the laser energy and the effect of defocusing.

In the case of an externally rolled fold, for example, the laser beam is directed against the cylindrical body of the container at an angle between a generatrix of the body and the beam which is 5° to 33° and into the crevice defined between the fold and the external surface of the body.

Although the fold is rolled along the exterior of the body, the initial bend of the closure member adjacent the interior of the body can form a similar crevice into which the laser beam is trained at the aforementioned angle to a generatrix of the body along its interior surface. The container can be held in a clamping or other gripping or engaging device which is preferably rotated to sweep the point of welding all around the seam or fold.

According to another feature of the invention, the fold can be rolled to include a sealing mass between the portions of the closure member and the container body.

More specifically, the method of the invention can comprise:

(a) folding together an edge portion of a sheet metal container closure and a rim of a generally cylindrical sheet metal container body to form an outwardly rolled fold at one end of a container formed by the closure and the body and forming a crevice between the body and material of the closure;

b) training a laser beam capable of fusing sheet metal into the crevice and against the body and onto the material to laser weld the body to the material at a location at which the laser beam is trained into the crevice; and (c) relatively displacing the container and the location to sweep the laser beam all along the crevice thereby forming a weld seam therealong between the body and the closure.

The apparatus can comprise:

means for seizing the container;
means for training a laser beam capable of fusing sheet metal into the crevice and against the body and onto the material to laser weld the body to the material at a location at which the laser beam is trained into the crevice; and means for relatively displacing the container and the location to sweep the laser beam all along the crevice thereby forming a weld seam therealong between the body and the closure.

Since the welding takes place deep within a crevice formed by the portions of the cover member and the container body of sheet metal within the fold, either externally of the body or internally thereof, the total energy of the laser beam can be utilized to form the weld and reflection losses ca be eliminated since there is practically no reflection from the crevice outwardly.

Furthermore, since the crevice is formed adjacent the body, the weld seam greatly strengthens the fold and stiffens the body so that the stability of the structure is greatly improved over earlier techniques. The weld seam, moreover, is protected from stresses which might otherwise be detrimental to the seam, e.g. impact at the outermost portions of the fold, thereby improving the sealing reliability of the container and enabling it to be subjected to considerable knocking about and wear and tear in use.

The welding can easily be carried out with different series of containers having differently formed folds.

As mentioned previously, especially effective results are obtained with respect to avoidance of reflection and loss of energy when the angle included between the laser beam and a generatrix of the body is between 5° and 33°. The angle is measured in the plane defined between the generatrix and the laser beam and, of course, it is also possible to incline the laser beam to the generatrix planes, i.e. planes defined between the respective generatrix and the axis of the cylindrical body.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
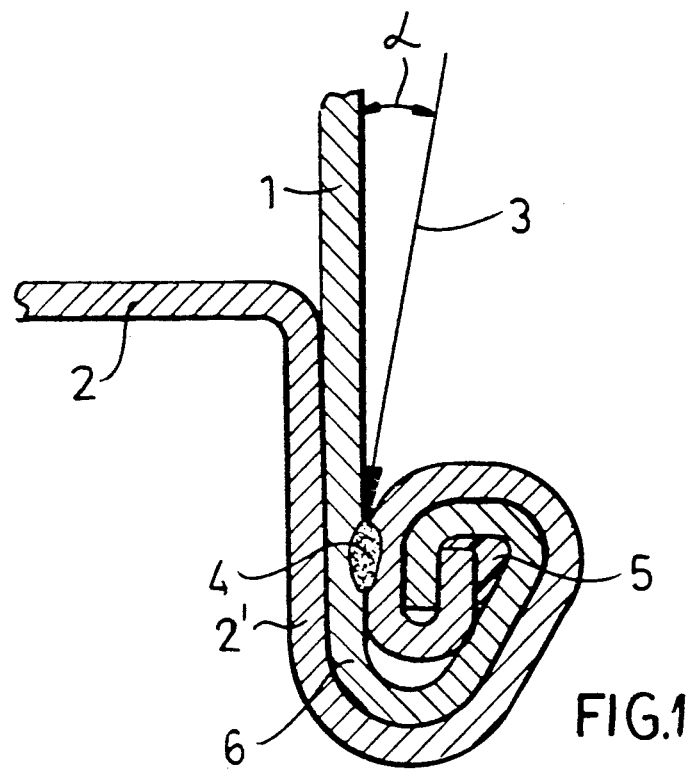
FIG. 1 is a detail cross section through a fold region of a container in which the laser beam is directed against the external surface of the cylindrical body into the crevice formed between the inwardly turned portion of the fold and the body.

In FIG. 1 there is shown the cylindrical body 1 of a container fabricated from sheet aluminum or steel and in which a bottom 2 forming the closure member is received.

The outer edge of the closure member 2 and the lower edge portion of the body are rolled together outwardly to form a fold represented generally at 6. Since the fold is brought inwardly against the outer surface of the body, a crevice is formed between the fold and the outer surface of the body.

According to the invention, a laser beam 3 of sufficient energy to cause fusion of the sheet metal of the closure member formed with an apron 2' and the body is trained at an angle α with the generatrix of the cylindrical body into the crevice to form the weld at the point 4 deep within the crevice and between the material of the closure member forming the fold 6 and the material of the body.

The angle is an acute angle of 5° to 33° and the weld seam is formed by rotating the container with respect to the laser beam to sweep the point 4 all around the periphery of the container. If there is any reflection within the crevice, of course, the reflection is from one surface or flank of the crevice toward the opposite flank thereof with little energy loss to the exterior.

To increase the reliability of the seal, a sealing mass 5 can be incorporated into the fold. The weld seam 4 stiffens the end of the container by fixing the outer surface of the fold to the body 1.

Simultaneously, a continuous flaw-free and firm connection is provided between the fold and the body which not only assures mechanical stiffening but also improved sealing.

This technique can be used with internally coated containers since the crevice is defined exclusively by external surfaces of the closure member and the container body. As a consequence, internal coatings do not create any particular problems.

The invention is applicable to multiple folds. For example, in the embodiment illustrated a double fold is provided in FIG. 1. Of course, three or more folds can be used if desired and even a single fold may be employed.

Because the weld sea is deep within the crevice defined between the fold and the container body, it is protected against mechanical action and stress. The stability and sealing effectiveness of the seam are thus not generally affected even if the container is dropped on its edge.

The weld seam 4 can also be applied to previously fabricated containers to increase the strength and sealing effectiveness of the fold and not only to containers which are provided with the fold just before the weld seam is applied.

Figure 2:
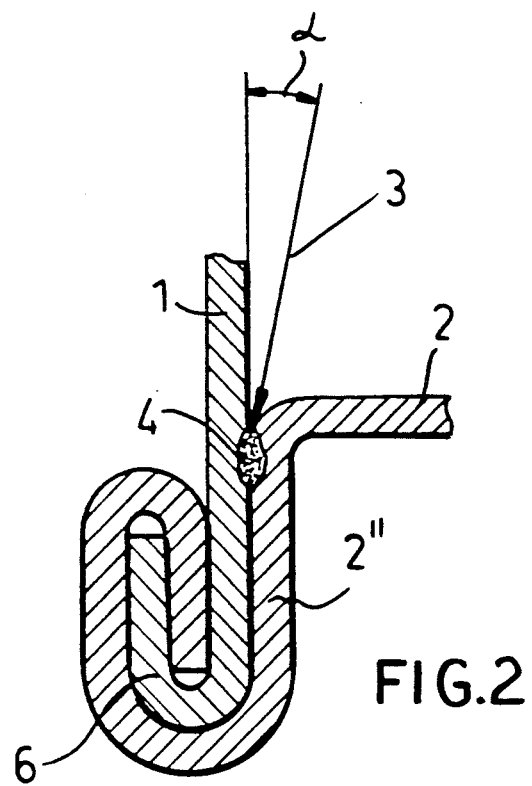
FIG. 2 is a view similar to FIG. 1 in which the laser beam is trained into the crevice formed between the portion of the closure member and the inner surface of the body wherein this portion of the closure member is then bent around to the exterior of the body.

FIG. 2 shows a similar detail view but of a system wherein the closure member, namely the cover or bottom is bent to define a crevice with the inner surface of the body and the weld seam 4 is provide internally.

In this embodiment as well, the body 1 of the container defines a fold 6 with the closure member 2 and a welding laser beam 3 is trained into the crevice defined between the apron 2" of the closure member 2 fitted into the container body and the latter. In this embodiment, the annular and uninterrupted weld seam 4 is located within the container and thus within the region surrounded by the fold so that it is protected by both the fold and the container from mechanical stress.

This embodiment has substantially all of the advantages of the embodiment of FIG. 1 with respect to increasing the stability of the container in the cover or bottom regions and providing a reliable seal. Additionally it enables a certain prestressing of the bottom or cover to be obtained so that upon later pressure loading of the container, the bulging of the cover or the bottom in the axial direction can be significantly reduced. This ensures that during transport or storage problems encountered as a result of internal pressure with domed bottoms or covers need not arise.

The angle α in this case is also preferably between 5° and 33° and the fold 6 can also include a sealing mass as has been illustrated in FIG. 1.

To form the weld seam, it is advantageous to provide a clamping, gripping or like device for receiving the container or container body to be welded and provided with a drive which can rotate this container-seizing device relative to a stationary laser generator. Alternatively, the laser generator maybe revolved around the container.

In either case, it is readily possible by mechanical, optical, inductive or capacitive sensing of the path, especially the rotary path of the container and thereby correct the spacing and orientation of the laser generator so that an optimal orientation will be maintained even in the case of irregular rotation paths, defects in gripping the container, etc.

Figure 3:
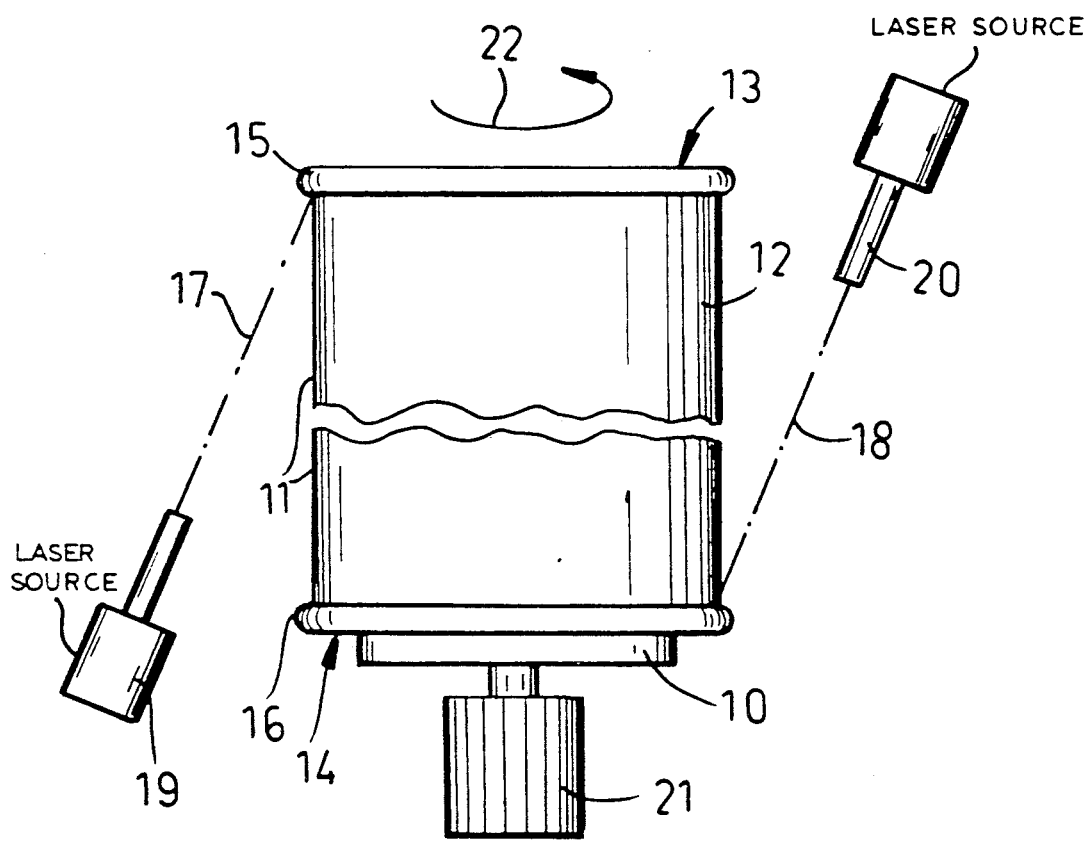
FIG. 3 is an illustration of the apparatus for making the welds of FIG. 1.

In FIG. 3, for example, the container-gripping device is shown as a magnetized turntable 10 which is received within the bottom of the container 11 which is shown to have a cylindrical body 12 and both a cover member 13 and a bottom member 14 at the ends thereof. The cover member can be provided with bungs for filling and emptying the container.

The upper and lower folds are represented at 15 and 16 and, in the manner described in connection with FIG. 1, respective laser weld seams can be formed in the crevices of these folds by the laser beams 17 and 18 produced by respective laser sources or generators 19 and 20 trained at the aforementioned angles against the container body into the crevices. A motor 21 can rotate the container as represented by the arrow 22.

Figure 4:
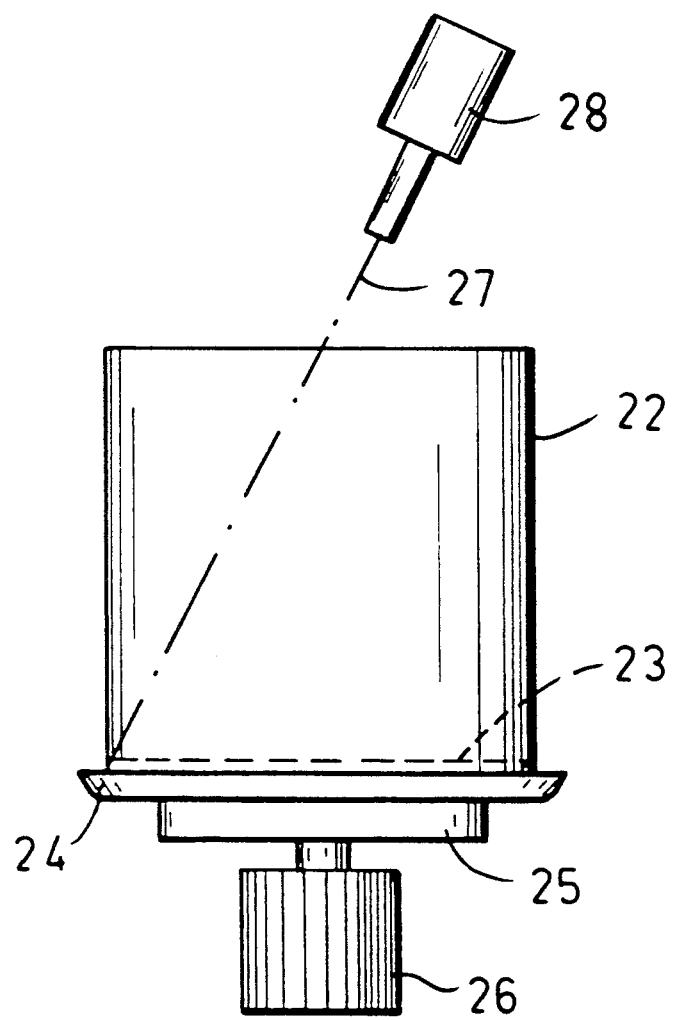
FIG. 4 is a diagram of the apparatus for making the weld of FIG. 2.

In FIG. 4 there is shown an apparatus for forming the laser weld as illustrated in FIG. 2. The container body 22 has its bottom 23 connected with the body by the fold 24 and is mounted upon a gripping device or turntable 25 driven by the motor 26 so as to rotate the container relative to the laser beam 27 produced by the laser generator 28. Here the laser beam is directed against the inner body surface as illustrated in FIG. 2.

I claim:

1. A method of making a container, comprising the steps of:

(a) folding together an edge portion of a sheet metal container closure and a rim of a generally cylindrical sheet metal container body formed with an interior to form an outwardly rolled fold at one end of a container formed by said closure and said body and forming a crevice on the interior of said body between a bend of said closure forming an apron of said closure extending along said body away from said bend to said outwardly rolled fold and said body;

(b) training a laser beam capable of fusing sheet metal into said crevice and against the interior of said body and onto material of said closure to laser weld said body to said material at a location at which said laser beam is trained into said crevice;

(c) relatively displacing said container and said location to sweep said laser beam all along said crevice thereby forming a weld seam therealong between the interior of said body and said apron of the closure; and (d) prestressing said closure upon folding and fusing together said edge portion of the sheet metal container closure and the body so that upon later pressure loading of the container, bulging of the closure in the axial direction is reduced.

2. The method defined in claim 1 wherein said closure is a cover closing a top of said body.

3. The method defined in claim 1 wherein said closure is a bottom closing a lower end of said body.

4. The method defined in claim 1 wherein said laser beam is trained at said location at an angle of 5° to 33° with said body.

5. The method defined in claim 1, further comprising the step of applying a sealing mass between said material and said rim and incorporating said sealing mass in said fold.

6. The method defined in claim 5 wherein said laser beam is trained at said location at an angle of 5° to 33° with said body.

7. The method defined in claim 6 wherein said closure is a cover closing a top of said body.

8. The method defined in claim 6 wherein said closure is a bottom closing a lower end of said body.

* * * * *